United States Patent
Furukawa

(10) Patent No.: US 12,065,098 B2
(45) Date of Patent: Aug. 20, 2024

(54) EXTENSION UNIT

(71) Applicant: SUBARU CORPORATION, Tokyo (JP)

(72) Inventor: Toshiya Furukawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/369,008

(22) Filed: Sep. 15, 2023

(65) Prior Publication Data

US 2024/0109510 A1    Apr. 4, 2024

(30) Foreign Application Priority Data

Oct. 4, 2022   (JP) .................. 2022-160595

(51) Int. Cl.
*B60R 22/30*    (2006.01)
*A44B 11/25*    (2006.01)
*B60R 22/18*    (2006.01)

(52) U.S. Cl.
CPC .......... *B60R 22/30* (2013.01); *A44B 11/2553* (2013.01); *B60R 22/18* (2013.01); *B60R 2022/1806* (2013.01); *B60R 2022/1812* (2013.01)

(58) Field of Classification Search
CPC . B60R 22/18; B60R 22/30; B60R 2022/1806; B60R 2022/1812; A44B 11/2553
See application file for complete search history.

(56) References Cited

U.S. PATENT DOCUMENTS

| | | | | |
|---|---|---|---|---|
| 6,871,876 B2* | 3/2005 | Xu | ...................... | A44B 11/2553 |
| | | | | 280/801.1 |
| 9,090,225 B2* | 7/2015 | Rouhana | ................. | B60R 22/18 |
| 11,230,257 B2* | 1/2022 | Nagasawa | ............... | B60R 22/42 |
| 11,246,379 B2* | 2/2022 | Bradley | ................. | A44B 11/06 |

FOREIGN PATENT DOCUMENTS

| | | | | |
|---|---|---|---|---|
| GB | 2170261 A | * | 7/1986 | ............. A44B 11/18 |
| JP | 2004-196181 A | | 7/2004 | |

* cited by examiner

*Primary Examiner* — Faye M Fleming
(74) *Attorney, Agent, or Firm* — MCGINN I.P. LAW GROUP, PLLC

(57) ABSTRACT

An extension unit includes a buckle member, a first coupling member, a second coupling member, and a webbing belt. The buckle member is engaged with a first tongue plate of a seat belt apparatus, includes a first holder holding the webbing belt, and a fixing member fixing an end of the webbing belt. The second coupling member is disposed between the buckle member and the first coupling member and coupled to the first coupling member. The webbing belt joins the buckle member and the first coupling member. The second coupling member is so disposed that a projected region extending inward in a vehicle width direction is defined. The projected region has a size corresponding to a thickness of an operator's hand and is not overlapped with the buckle member. The second coupling member includes a second holder holding the webbing belt extending from the first holder to the fixing member.

5 Claims, 7 Drawing Sheets

EXTENSION UNIT

CROSS-REFERENCE TO RELATED APPLICATIONS

The present application claims priority from Japanese Patent Application No. 2022-160595 filed on Oct. 4, 2022, the entire contents of which are hereby incorporated by reference.

BACKGROUND

The disclosure relates to an extension unit.

In general, a seat belt apparatus is mounted on a vehicle such as an automobile to secure safety of an occupant in the vehicle.

The seat belt apparatus includes a buckle device that locks a webbing worn by the occupant in a detachable manner.

The buckle device generally includes a tongue plate through which the webbing (belt) extends, and a buckle body to receive the tongue plate. When the tongue plate is inserted into the buckle body, the buckle body locks the tongue plate.

The buckle body includes a buckle base, a latch mechanism, and a buckle cover. The latch mechanism attaches the tongue plate to the buckle base and detaches the tongue plate from the buckle base. The buckle cover surrounds the latch mechanism.

The buckle base is fixed to the body of a vehicle via the webbing and a bracket or a wire, for example. Upon contact of the vehicle, the buckle base transmits a tension load exerted onto the webbing to the body of the vehicle.

The latch mechanism enables the tongue plate to be attached to or detached from the buckle base. This allows an occupant of the vehicle to easily wear and take off of the seat belt apparatus. When the tongue plate is inserted into the buckle base, a latch member of the latch mechanism is engaged in a latch engagement hole of the tongue plate. This prevents the tongue plate from detaching.

For occupants for whom an ordinary seat belt webbing is too short to wear, extension units (extender belts) are prepared, which are available from dealers or the like.

The extender belt is inserted between the tongue plate and the buckle body of the seat belt apparatus mounted on the vehicle in order to strap the occupant for whom an ordinary seat belt webbing is too short to wear.

Some techniques have been proposed that further certainly maintain the engaged state of the tongue plate even when an inertial force or a contact load is exerted in a longitudinal direction of the buckle body of the extension unit. For example, Japanese Unexamined Patent Application Publication (JP-A) No. 2004-196181 discloses a technique relating to such a seat belt device. The seat belt device disclosed in JP-A No. 2004-196181 includes a buckle body that includes a buckle base, a latch member, a holding mechanism, and a releasing member. The latch member is supported by the buckle base and engaged with a tongue plate inserted into the buckle body to maintain a locked state in which the tongue plate is prevented from moving in a pull-out direction. The holding mechanism maintains the locked state of the tongue plate even when an inertial force or a contact load is exerted on the buckle body. The releasing member releases the engagement of the tongue plate with the latch member. The buckle body is attached to the body of the vehicle via a webbing.

SUMMARY

An aspect of the disclosure provides an extension unit to be applied to a seat belt apparatus for a vehicle. The extension unit includes a buckle member, a first coupling member, a second coupling member, and a webbing belt. The buckle member is to be engaged with a first tongue plate of the seat belt apparatus. The first coupling member includes a second tongue plate to be engaged with a buckle body of the seat belt apparatus. The second coupling member is disposed between the buckle member and the first coupling member, and includes a coupling mechanism to be coupled to the first coupling member. The webbing belt joins the buckle member and the first coupling member. The buckle member includes a first holder and a fixing member. The first holder holds a part of the webbing belt extending from the first coupling member. The fixing member fixes an end of the webbing belt. The first coupling member includes a third tongue plate to be engaged with the coupling mechanism of the second coupling member. The second coupling member is so disposed that a projected region extending inward in a width direction of the vehicle is defined. The projected region has a size corresponding to a thickness of an operator's hand and is not overlapped with the buckle member. The second coupling member includes the second holder holding a part of the webbing belt extending from the first holder to the fixing member.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
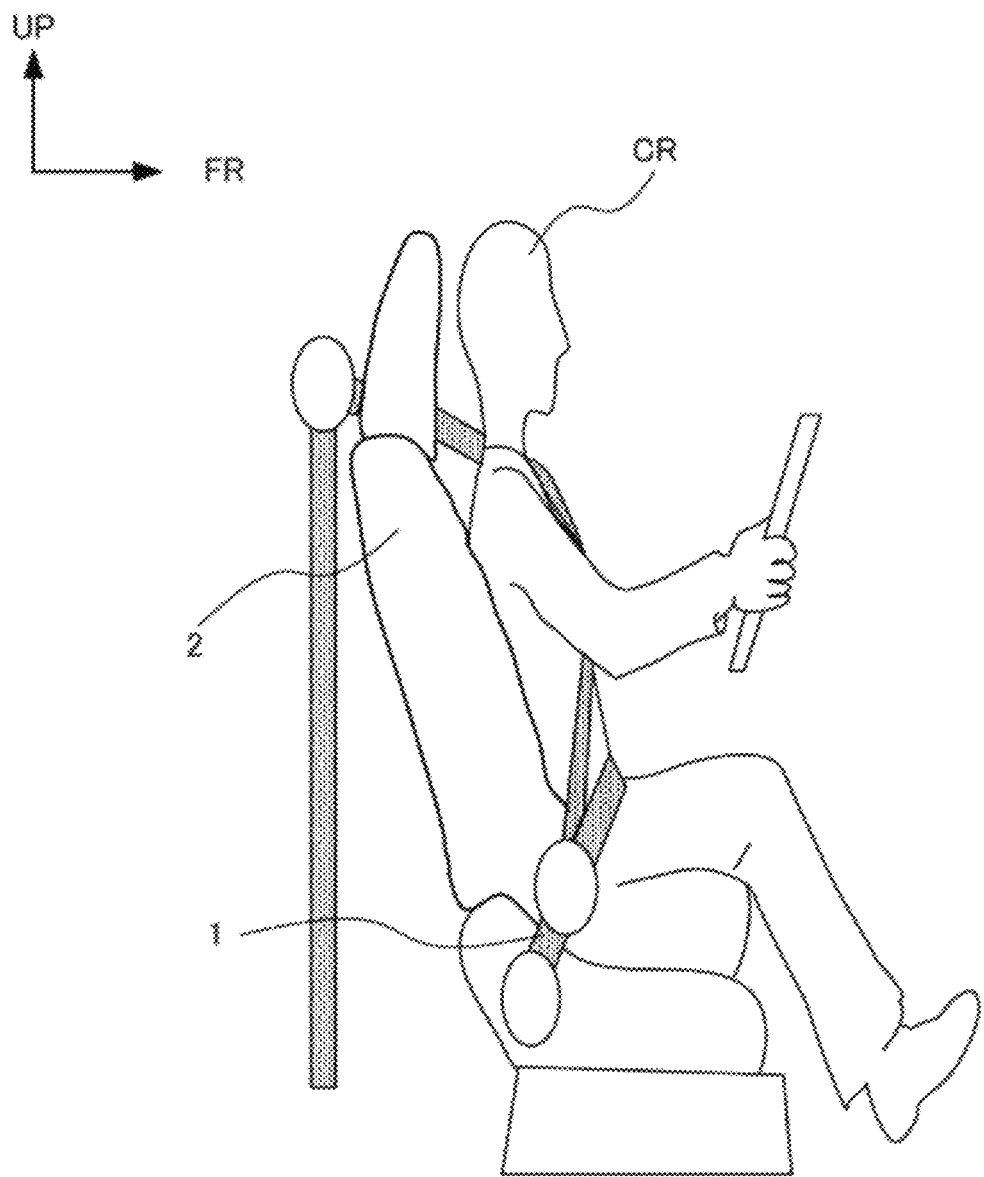
FIG. 1 is a side view of an extension unit according to one example embodiment of the disclosure that is worn by an occupant as seen in a vehicle width direction.

In general, an extension unit is used mainly by an occupant with a considerably large body frame. The occupant with a considerably large body frame has a difficulty in visually recognizing an inner belt hidden by his/her body. Therefore, there is room for improvement in easiness to wear.

In addition, when the extension unit is used, an outer belt that straps the body and the pelvis of the occupant can be folded back at a position deviated from a reference position in some cases. This can decrease binding performance upon contact of the vehicle, resulting in unstable behavior of the upper body upon the contact.

It is desirable to provide an extension unit with improved easiness to wear and binding performance equivalent to that of a general seat belt apparatus.

Example Embodiment

In the following, an extension unit 1 according to an example embodiment of the disclosure is described with reference to FIGS. 1 to 7.

Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Note that arrows FR and UP illustrated in the drawings as needed represent a frontward direction and an upward direction of a vehicle in front view, respectively. In the following, the description on vertical, longitudinal, and lateral directions are based on the upward and downward directions, the frontward and rearward directions, and the leftward and rightward directions, in front view of the vehicle, respectively, unless otherwise stated.

As used herein, the term "collision" may be used interchangeably with the term "contact".

<Extension Unit 1>

As illustrated in FIG. 1, the extension unit 1 according to the example embodiment may be used when an occupant CR is seated in a seat 2 disposed inside the vehicle. The extension unit 1 may be disposed between a tongue plate and a buckle body of a seat belt apparatus, and may be movable in a stretchable manner, as described below.

In the following, the extension unit 1 is described with reference to the accompanying drawings.

<Exemplary Configuration of Extension Unit 1>

Figure 2:
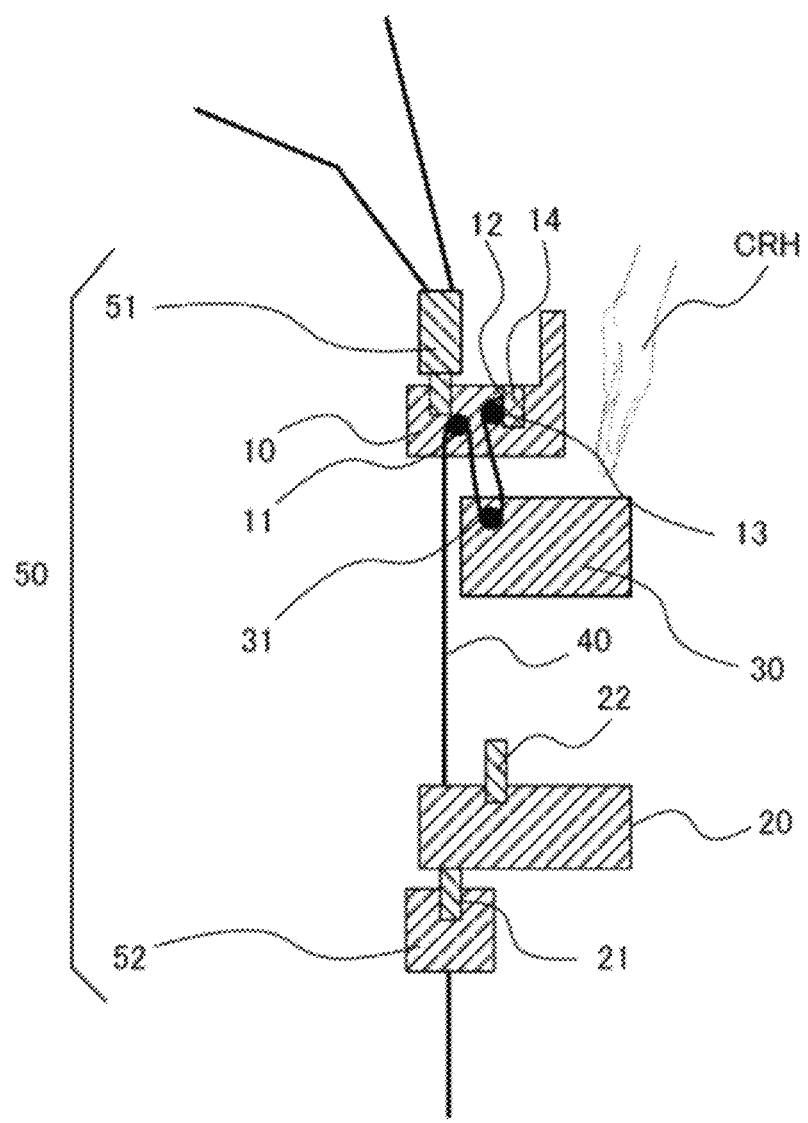
FIG. 2 is a longitudinal cross-sectional view of the extension unit according to one example embodiment of the disclosure that is coupled to a seat belt apparatus.

As illustrated in FIG. 2, the extension unit 1 according to the example embodiment includes a buckle member 10, a first coupling member 20, a second coupling member 30, and a webbing belt 40.

[Buckle Member 10]

As illustrated in FIG. 2, the buckle member 10 is engaged with a first tongue plate 51 of a seat belt apparatus 50.

For example, the buckle member 10 may include a buckle base, a latch mechanism, and a buckle cover that are not illustrated. The latch mechanism may attach the first tongue plate 51 of the seat belt apparatus 50 to the buckle base and may detach the first tongue plate 51 of the seat belt apparatus 50 from the buckle base. The buckle cover may surround the latch mechanism.

As illustrated in FIG. 2, the buckle member 10 includes a first holder 11, a fixing member 12, and a third holder 13. The first holder 11 holds a part of the webbing belt 40 extending from the first coupling member 20. The fixing member 12 fixes one end of the webbing belt 40. The third holder 13 holds a part of the webbing belt 40 extending from a second holder 31 (to be described later) to the fixing member 12.

The first holder 11 and the third holder 13 may each have a length longer than the width of the webbing belt 40. The first holder 11 and the third holder 13 may be each a rod member having a pin shape and including a metal or resin material, for example. One end of the first holder 11 and one end of the third holder 13 may be bonded or welded to an inner wall of the buckle member 10, for example.

As illustrated in FIG. 2, the buckle member 10 may include a button 14 to which a pusher is joined. The pusher may be movable in the vertical direction to release the engagement of the buckle member 10 with the first tongue plate 51 of the seat belt apparatus 50. The fixing member 12 may be provided on a side face of the pusher, and the end of the webbing belt 40 may be fixed to the side face of the pusher. Further, as illustrated in FIG. 2, the third holder 13 may be provided near the pusher joined to the button 14.

Further, as illustrated in FIG. 2, when the first tongue plate 51 of the seat belt apparatus 50 is engaged with the buckle member 10, the webbing belt 40 extending from the first coupling member 20 may be locked between the first holder 11 and the tip of the first tongue plate 51 of the seat belt apparatus 50.

Figure 3:
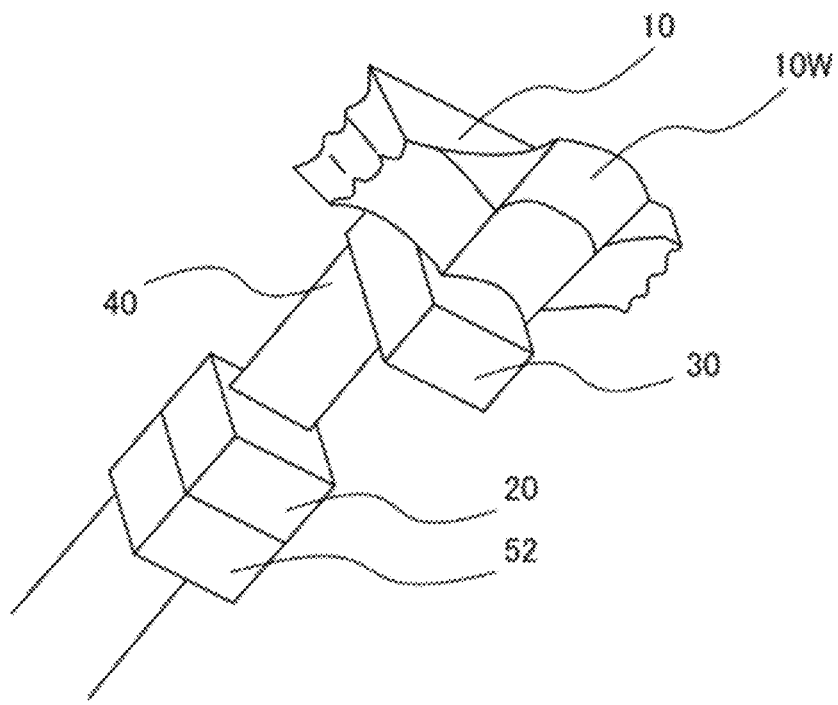
FIG. 3 is a perspective view of the extension unit according to one example embodiment of the disclosure for describing an exemplary shape of the extension unit.

Further, as illustrated in FIG. 3, a curved wall 10W protruding inward in the vehicle width direction may be provided on a surface of the buckle member 10 facing outward in the vehicle width direction.

[First Coupling Member 20]

The first coupling member 20 may include resin, for example. As illustrated in FIG. 2, the first coupling member 20 may include a second tongue plate 21 and a third tongue plate 22. The second tongue plate 21 may be disposed above the body of a buckle (hereinafter referred to as a buckle body) 52 of the seat belt apparatus 50, and may be engaged with the buckle body 52 of the seat belt apparatus 50. The third tongue plate 22 may be engaged with the second coupling member 30 to be described later.

[Second Coupling Member 30]

As illustrated in FIG. 2, the second coupling member 30 may be disposed between the buckle member 10 and the first coupling member 20. The second coupling member 30 may include a coupling mechanism to be coupled to the buckle member 10 via the first coupling member 20 and the webbing belt 40, and an engaging mechanism to be engaged with the third tongue plate 22 of the second coupling member 30.

The second coupling member 30 is so disposed that a projected region extending inward in the vehicle width direction is defined. The projected region has a size corresponding to the thickness of a hand of an operator and is not overlapped with the buckle member 10. In addition, the second coupling member 30 includes the second holder 31. The second holder 31 serves as a coupling mechanism that holds a part of the webbing belt 40 extending from the first holder 11 to the fixing member 12.

The second holder 31 may have a length longer than the width of the webbing belt 40. The second holder 31 may be a rod member having a pin shape and including a metal or resin material, for example. The second holder 31 may be moved in the vertical direction when one end of the second holder 31 is urged by an external force.

Figure 7:
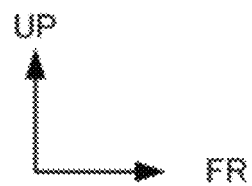
FIG. 7 is a longitudinal cross-sectional view of the extension unit according to one example embodiment of the disclosure for describing an internal structure of a second holder.
Figure 7:
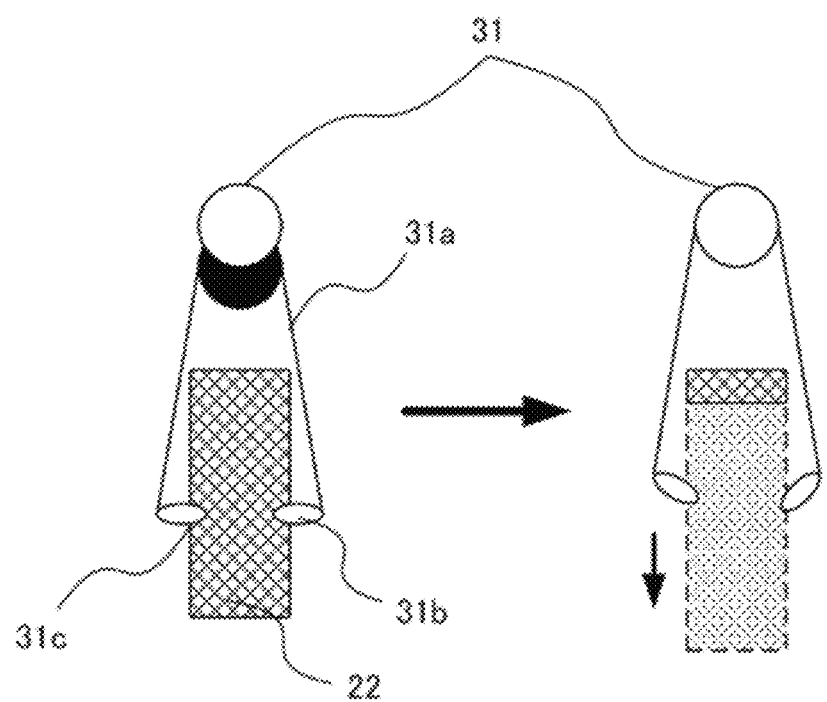

As illustrated in FIG. 7, a center portion of a U-shaped elastic member 31a may be joined to one end of the second holder 31 such that the U-shaped elastic member 31a opens downward. One end of an oval fitting member 31b may be coupled to each tip of the U-shaped elastic member 31a. Upon locking, the other end of the oval fitting member 31b may be fitted into a recess 31c provided on the third tongue plate 22 of the first coupling member 20.

The engaging mechanism may include a buckle base, a latch mechanism, and a buckle cover that are not illustrated. The latch mechanism may attach the third tongue plate 22 of the first coupling member 20 to the buckle base and may detach the third tongue plate 22 of the first coupling member 20 from the buckle base. The buckle cover may surround the latch mechanism.

[Webbing Belt 40]

As illustrated in FIG. 2, the webbing belt 40 joins the buckle member 10 and the first coupling member 20.

For example, the webbing belt 40 may include a polyester material heavily woven to maintain the tensile strength.

<Behavior of Extension Unit 1 Upon Wearing Seatbelt with Extension Unit 1>

Figure 4:
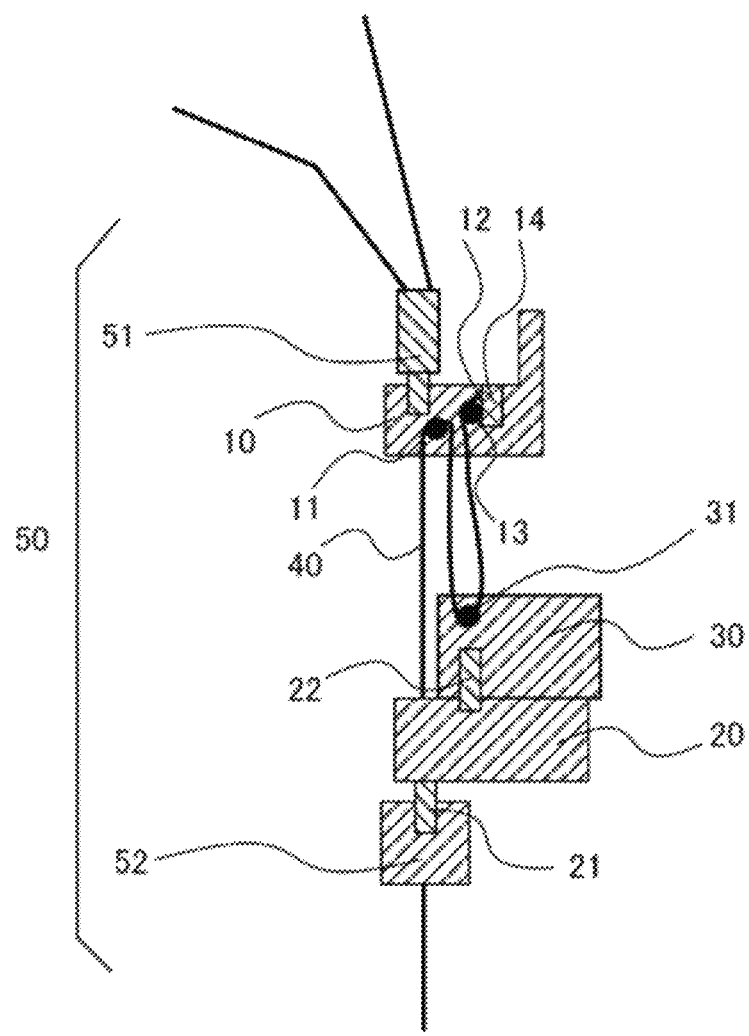
FIG. 4 is a longitudinal cross-sectional view of the extension unit according to one example embodiment of the disclosure in a state where a first coupling member is joined to a second coupling member.

Next, a behavior of the extension unit 1 upon wearing the seat belt with the extension unit 1 according to the example embodiment is described with reference to FIGS. 2 to 4.

The extension unit 1 may be used in a state where the second tongue plate 21 of the first coupling member 20 of the extension unit 1 is engaged with the buckle body 52 of the seat belt apparatus 50.

When being seated in the seat 2, the occupant CR may hold the buckle member 10 of the extension unit 1 in one hand, and may draw the first tongue plate 51 of the seat belt apparatus 50 and engage and lock the first tongue plate 51 with the buckle member 10 of the extension unit 1 by the other hand.

At this time, the webbing belt 40 extending from the first coupling member 20 may be locked between the first holder 11 of the buckle member 10 of the extension unit 1 and the tip of the first tongue plate 51 of the seat belt apparatus 50.

Thereafter, the occupant CR may put his/her hand CRH into the projected region of the second coupling member 30 so as to hold a palm (the hand CRH) over the curved wall 10W protruding inward in the vehicle width direction on the surface of the buckle member 10 facing outward in the vehicle width direction, and may push the second coupling member 30 of the extension unit 1 in the downward direction by putting the fingers on the projected region of the second coupling member 30 of the extension unit 1 not overlapping with the buckle member 10.

The webbing belt 40 joining the buckle member 10 and the first coupling member 20 may be thereby reeled by the downward force applied by the hand CRH of the occupant CR. This may bring the second coupling member 30 of the extension unit 1 closer to the first coupling member 20, and the third tongue plate 22 of the first coupling member 20 may be fit into the engaging mechanism of the second coupling member 30 and locked, as illustrated in FIG. 4. Wearing the seat belt may be thereby completed.

<Behavior of Extension Unit 1 Upon Taking Off Seatbelt with Extension Unit 1>

A behavior of the extension unit 1 upon taking off the seat belt with the extension unit 1 according to the example embodiment will now be described with reference to FIGS. 4 to 7.

To take off the seat belt with the extension unit 1, the occupant CR may press the button 14. The pusher joined to the button 14 may be movable in the vertical direction to release the engagement between the buckle member 10 of the extension unit 1 and the first tongue plate 51 of the seat belt apparatus 50.

Figure 5:
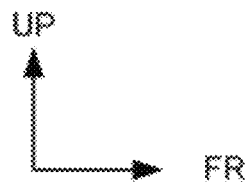
FIG. 5 is a longitudinal cross-sectional view of the extension unit according to one example embodiment of the disclosure for describing an internal structure of the extension unit.
Figure 5:
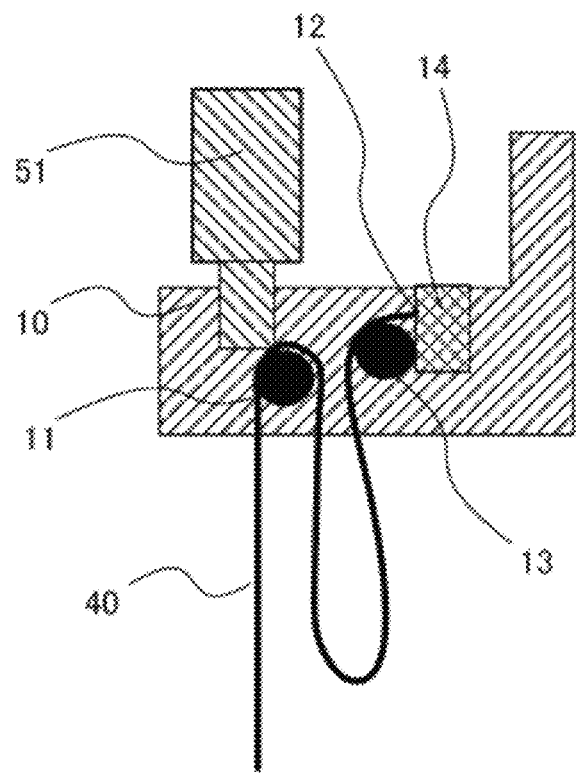

As illustrated in FIG. 5, the fixing member 12 fixing the end of the webbing belt 40 is provided on the side face of the pusher. Accordingly, when the button 14 is pressed down by the occupant CR, the pusher may be urged downward by the operation of the button 14 as indicated by an arrow (1) in FIG. 6, and the end of the webbing belt 40 may be pulled upward, generating a tension in a direction indicated by an arrow (2) in FIG. 6.

When the engagement between the first tongue plate 51 of the seat belt apparatus 50 and the buckle member 10 of the extension unit 1 is released by the operation of the button 14 by the occupant CR, the webbing belt 40 locked between the first holder 11 of the buckle member 10 of the extension unit 1 and the tip of the first tongue plate 51 of the seat belt apparatus 50 may also be released. In addition, as illustrated in FIG. 6, the second holder 31 may be displaced upward from a position indicated by a solid circle to a position indicated by a hollow circle by the tension in the direction indicated by the arrow (2).

Figure 6:
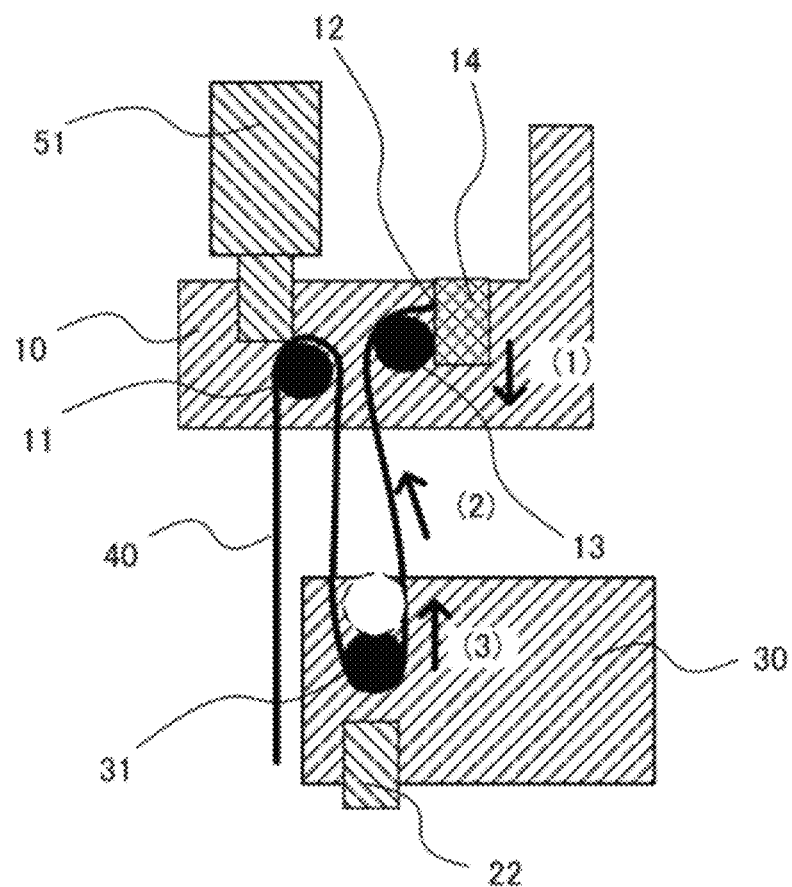
FIG. 6 is a longitudinal cross-sectional view of the extension unit according to one example embodiment of the disclosure for describing internal structures of a buckle member and the second coupling member.

When the position of the second holder 31 is displaced upward as illustrated in FIG. 6, the U-shaped elastic member 31a of which center portion is joined to the one end of the second holder 31 such that the U-shaped elastic member 31a opening downward may be lifted upward as illustrated in FIG. 7. This may release the fitting of the other end of the oval fitting member 31b coupled to each tip of the U-shaped elastic member 31a in the recess 31c of the third tongue plate 22 engaged with the first coupling member 20, allowing the extension unit 1 to be removed and return to an original state.

<Workings and Effects>

According to the example embodiment described above, the extension unit 1 includes the buckle member 10, the first coupling member 20, the second coupling member 30, and the webbing belt 40. The buckle member 10 is to be engaged with the first tongue plate 51 of the seat belt apparatus 50. The first coupling member 20 includes the second tongue plate 21 to be engaged with the buckle body 52 of the seat belt apparatus 50. The second coupling member 30 is disposed between the buckle member 10 and the first coupling member 20, and includes the coupling mechanism to be coupled to the first coupling member 20. The webbing belt 40 joins the buckle member 10 and the first coupling member 20. The buckle member 10 includes the first holder 11 and the fixing member 12. The first holder holds a part of the webbing belt 40 extending from the first coupling member 20. The fixing member 12 fixes the end of the webbing belt 40. The first coupling member 20 includes the third tongue plate 22 to be engaged with the coupling mechanism of the second coupling member 30. The second coupling member 30 is so disposed that the projected region extending inward in the vehicle width direction is defined. The projected region has a size corresponding to the thickness of an operator's hand and is not overlapped with the buckle member 10. The second coupling member 30 includes the second holder 31 that holds a part of the webbing belt 40 extending from the first holder 11 to the fixing member 12.

That is, the end of the webbing belt 40 extending from the first coupling member 20 to the buckle member 10 is fixed to the fixing member 12 of the buckle member 10 via the first holder 11 and the second holder 31. Accordingly, the buckle member 10 and the second coupling member 30 are joined to each other by the tension of the webbing belt 40.

Further, the second coupling member 30 is so disposed that the projected region extending inward in the vehicle width direction is defined. The projected region has the size corresponding to the thickness of the hand CRH of the occupant CR or the operator, and is not overlapped with the buckle member 10. Accordingly, when the second coupling member 30 is pushed downward by the hand CRH of the occupant CR or the operator, the third tongue plate 22 of the first coupling member 20 is engaged and fixed with the coupling mechanism of the second coupling member 30 by the tension of the webbing belt 40.

Accordingly, it is possible for the occupant CR or the operator to easily wear the seat belt with the extension unit 1 by simply putting the hand CRH into the projected region of the second coupling member 30 and pushing the second coupling member 30 downward.

Further, when the occupant CR or the operator puts the hand CRH into the projected region of the second coupling member 30 and pushes the second coupling member 30 downward, the first coupling member 20 is engaged with the second coupling member 30, locking the seat belt apparatus 50. This makes it possible to maintain a fulcrum substantially the same as that of an ordinary seat belt.

Accordingly, it is possible to improve the easiness to wear and maintain the binding performance equivalent to that of the general seat belt apparatus 50.

According to the extension unit 1 of the example embodiment, the curved wall 10W protruding inward in the vehicle width direction may be provided on the surface of the buckle member 10 facing outward in the vehicle width direction.

The curved wall 10W may serve as a guide for the hand CRH of the occupant CR or the operator inserted into the projected region of the second coupling member 30, and may hold the hand CRH of the occupant CR therein.

Accordingly, it is possible for the occupant CR or the operator to complete the locking operation by simply putting the hand CRH into the projected region of the second coupling member 30 and pushing the second coupling member 30 downward. This significantly improves the easiness to wear.

According to the extension unit 1 of the example embodiment, when the first tongue plate 51 of the seat belt apparatus 50 is engaged with the buckle member 10, a part of the webbing belt 40 is locked between the first tongue plate 51 of the seat belt apparatus 50 and the first holder 11.

That is, when the part of the webbing belt 40 is locked between the first tongue plate 51 of the seat belt apparatus 50 and the first holder 11, a tension is generated on the webbing belt 40 extending from the first coupling member 20.

The tension contributes to stabilize an operational direction in which the hand CRH of the occupant CR or the operator is put into the projected region of the second coupling member 30 to push the second coupling member 30 downward.

Accordingly, it is possible for the occupant CR or the operator to complete the locking operation by simply putting the hand CRH into the projected region of the second coupling member 30 and pushing the second coupling member 30 downward. This significantly improves the easiness to wear.

Further, according to the extension unit 1 of the example embodiment, the buckle member 10 may include the button 14 provided on the rear face of the curved wall 10W protruding inward in the vehicle width direction. The button 14 may include the pusher movable in the vertical direction to release the engagement of the buckle member 10 with the first tongue plate 51 of the seat belt apparatus 50. The fixing member 12 may be provided on the side face of the pusher. The second holder 31 may be movable in the vertical direction.

That is, the buckle member 10 may include the button 14 having the pusher movable in the vertical direction to release the engagement of the buckle member 10 with the first tongue plate 51 of the seat belt apparatus 50. The fixing member 12 may be provided on the side face of the pusher. The second holder 31 may be movable in the vertical direction.

When the occupant CR presses down the button 14, the pusher may be pushed downward. The fixing member 12 fixing the end of the webbing belt 40 is provided on the side face of the pusher. Accordingly, when the pusher is pushed downward by operating the button 14, the end of the webbing belt 40 is thereby pulled, generating a downward tension.

Further, when the engagement between the first tongue plate 51 of the seat belt apparatus 50 and the buckle member 10 of the extension unit 1 is released by the operation of the button 14 performed by the occupant CR, the webbing belt 40 locked between the first holder 11 of the extension unit 1 and the tip of the first tongue plate 51 of the seat belt apparatus 50 is also released, generating an upward tension. The second holder 31 is displaced upward by the upward tension.

When the position of the second holder 31 is displaced upward, the U-shaped elastic member 31a of which center portion is joined to the one end of the second holder 31 such that the U-shaped elastic member 31a opening downward is lifted upward. This releases the fitting of the other end of the oval fitting member 31b coupled to each tip of the U-shaped elastic member 31a in the recess 31c of the third tongue plate 22 engaged with the first coupling member 20, allowing the extension unit 1 to be removed and return to the original state.

Accordingly, it is possible to improve the easiness to wear and maintain the binding performance equivalent to that of the general seat belt apparatus 50.

Modification Example 1

According to the extension unit 1 of the foregoing example embodiment, the buckle member 10 may have the curved wall 10W protruding inward in the vehicle width direction on the surface facing outward in the vehicle width direction. However, according to Modification Example 1, a grip may be provided on each of the opposite sides of the curved wall 10W. To hold the buckle member 10, the occupant CR or the operator may hold the grip by the hand other than the hand CRH put into the projected region.

Such a structure allows the occupant CR to put the hand CRH into the projected region of the second coupling member 30 while holding the buckle member 10 by the other hand. Accordingly, it is possible to perform the operation to wear the seat belt in a stable manner.

Modification Example 2

According to the extension unit 1 of the foregoing example embodiment, the buckle member 10 may have the curved wall 10W protruding inward in the vehicle width direction on the surface facing outward in the vehicle width direction. However, according to Modification Example 2, a cylindrical body may be coupled to the surface of the buckle member 10 facing outward in the vehicle width direction.

The cylindrical body may have an inner space having dimensions corresponding the width and thickness of the hand CRH of the occupant CR to be put therein.

Such a structure allows the occupant CR to perform the operation while keeping the hand CRH put into the projected region of the second coupling member 30 in a stable state.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

According to one or more example embodiments of the disclosure, it is possible to improve the easiness to wear and to maintain the binding performance equivalent to that of a general seat belt apparatus.

The invention claimed is:

1. An extension unit to be applied to a seat belt apparatus for a vehicle, the extension unit comprising:
   a buckle member to be engaged with a first tongue plate of the seat belt apparatus;
   a first coupling member comprising a second tongue plate to be engaged with a buckle body of the seat belt apparatus;
   a second coupling member disposed between the buckle member and the first coupling member, the second coupling member comprising a coupling mechanism to be coupled to the first coupling member; and
   a webbing belt joining the buckle member and the first coupling member, wherein
   the buckle member comprises a first holder and a fixing member, the first holder holding a part of the webbing belt extending from the first coupling member, the fixing member fixing an end of the webbing belt,
   the first coupling member comprises a third tongue plate to be engaged with the coupling mechanism of the second coupling member,
   the second coupling member is so disposed that a projected region extending inward in a width direction of the vehicle is defined, the projected region having a size corresponding to a thickness of an operator's hand, the projected region not being overlapped with the buckle member, and
   the second coupling member comprises a second holder holding a part of the webbing belt extending from the first holder to the fixing member.

2. The extension unit according to claim 1, wherein the buckle member has a curved wall protruding inward in the width direction of the vehicle on a surface facing outward in the width direction of the vehicle.

3. The extension unit according to claim 1, wherein, when the first tongue plate of the seat belt apparatus is engaged with the buckle member, the part of the webbing belt extending from the first coupling member is locked between the first tongue plate of the seat belt apparatus and the first holder.

4. The extension unit according to claim 2, wherein, when the first tongue plate of the seat belt apparatus is engaged with the buckle member, the part of the webbing belt extending from the first coupling member is locked between the first tongue plate of the seat belt apparatus and the first holder.

5. The extension unit according to claim 2, wherein
   the buckle member comprises a button on a rear face of the curved wall protruding inward in the width direction of the vehicle,
   the button comprises a pusher movable in a vertical direction to release engagement of the buckle member with the first tongue plate of the seat belt apparatus,
   the fixing member is provided on a side face of the pusher, and
   the second holder is movable in the vertical direction.

* * * * *